United States Patent [19]

Schoening et al.

[11] Patent Number: 4,661,313

[45] Date of Patent: Apr. 28, 1987

[54] METAL LINER FOR THE LINING OF THE CYLINDRICAL CAVITY OF A REINFORCED CONCRETE PRESSURE VESSEL

[75] Inventors: Josef Schoening, Hambruecken; Claus Elter, Bad Durkheim; Gerhard Becker, Mannheim, all of Fed. Rep. of Germany

[73] Assignee: Hochtemperatur-Reaktorbau GmbH, Fed. Rep. of Germany

[21] Appl. No.: 622,444

[22] Filed: Jun. 20, 1984

[30] Foreign Application Priority Data

Jun. 25, 1983 [DE] Fed. Rep. of Germany ....... 3322998

[51] Int. Cl.$^4$ ............................................ G21C 13/02
[52] U.S. Cl. .................................. 376/295; 376/296; 52/248; 52/224
[58] Field of Search ............... 376/295, 296; 52/169.6, 52/170, 224, 248, 249, 268, 269

[56] References Cited

U.S. PATENT DOCUMENTS

| | | | |
|---|---|---|---|
| 3,454,080 | 7/1969 | Kunzli | 376/296 |
| 3,589,088 | 6/1971 | Seidl | 376/296 X |
| 3,893,508 | 7/1975 | Nemet | 376/296 X |
| 4,153,103 | 5/1979 | Bachli | 52/269 X |
| 4,265,066 | 5/1981 | Lin et al. | 376/296 X |
| 4,458,458 | 7/1984 | Orii | 376/295 X |

FOREIGN PATENT DOCUMENTS 3321255  6/1983  Fed. Rep. of Germany ...... 376/295

*Primary Examiner*—Peter A. Nelson
*Attorney, Agent, or Firm*—Robert J. Koch

[57] ABSTRACT

A cost-effective configuration of a metal liner for a reinforced concrete pressure vessel is disclosed wherein only stud shear connectors and cooling tubes of the liner cooling system are used to anchor the liner and the passages provided in the liner and the wall of the vessel. In the areas of the introduction of forces, stud connectors of different stud rigidities are used. In the anchoring of loads which is again effected by stud connectors only, further transmission is obtained by means of reinforcing rods.

14 Claims, 9 Drawing Figures

METAL LINER FOR THE LINING OF THE CYLINDRICAL CAVITY OF A REINFORCED CONCRETE PRESSURE VESSEL

BACKGROUND OF THE INVENTION

1. Field of the Invention

The invention relates to a metal liner for the internal lining of the cylindrical cavity of a reinforced concrete pressure vessel cavity for a nuclear reactor installation. Gas cooled, high temperature nuclear reactors are exemplary of this type of lining and cylindrical cavity area. The liner is anchored to the wall of the vessel by means of stud shear connectors and with cooling tubes welded to it on the concrete side. A plurality of passages are provided through the liner and the wall of the vessel. The passages are lined with a steel tube.

2. Background of the Art

It is known in the prior art to anchor in a reinforced concrete pressure vessel intended to house a nuclear reactor, lined with a metal liner, means of suitable fasteners, such as stud shear connectors, ribs or claws in the concrete. This prevents the bulging of the liner in case of a pressure drop inside the vessel. Reinforced concrete pressure vessels are described, for example, in West German Published Application No. 2227394 and West German Offenlegungsshrift Nos. 2921707 and 3009826. To avoid excessive thermal loads on the concrete, the known vessels are equipped with a thermal protection system, consisting of a plurality of cooling tubes welded to the liner on the side of the concrete.

Both the walls of the reinforced concrete pressure vessel and the liner must be provided with a series of passages to make the installation and removal of reactor components, the insertion of shutdown and control rods, the introduction of measuring instruments and the in- and outflow of the primary or the secondary medium possible. The passages are conventionally equipped with a steel lining as shown in West German Offenlegungsschrift No. 3009826.

Reinforced concrete pressure vessels have further been proposed, wherein the liner is not anchored in the vessel. To prevent the bulging of the liner in case of a pressure drop inside the vessel or stressing by varying temperatures, special measures must be taken in the case of such pressure vessels. These may consist of the arrangement of a plurality of steel scaffoldings having the necessary rigidity on the inner side of the liner, as described in West German Pat. No. 2717705.

SUMMARY OF THE INVENTION

The invention is an improvement on the liner described initially. One of the objects is to provide a cost-effective configuration for this known type of liner, which satisfies all requirements concerning mechanical strength and quality.

According to the invention, the aforementioned object is attained by:

(a) correlating the thickness of the liner with the grid of stud shear connectors, which in turn is determined by the spacing of the cooling tubes and the reinforcement of the concrete;

(b) using, in addition to the stud shear connectors, the cooling tubes for the anchoring of the liner and arranging them so that they will have the highest support effect;

(c) providing stud shear connectors with different bolt rigidities at the location of the introduction of forces;

(d) utilizing, in the case of loads acting on the liner, anchoring means in the concrete comprising stud shear connectors only and providing reinforcing rods for the transfer of loads acting on the liner anchoring means;

(e) anchoring the steel tubes of the passages in the concrete in a conventional manner by means of stud shear connectors and securing the steel tubes against being forced out by mounting cooling tubes by means of welding in the circumferential direction and by means of stud shear connectors, and (f) taking into account friction to anchor the liner in areas where it doubtlessly exsists.

For anchoring the liner according to the invention, only stud shear connectors and the cooling tubes of the liner cooling system are used. In cooperation with a certain liner thickness, the stud shear connectors assure the necessary security against bulging. The use of ribs and claws as in conventional anchoring arrangements is eliminated as these represent heat bridges conducting excessive heat into the concrete and, therefore, requiring additional cooling. In addition, this elimination reduces the need for reinforcement.

In the case of the steel tubes of the passages again, only stud shear connectors are used. The special elements used in conventional anchoring arrangements to secure against ejection are eliminated. This task is performed by means of the special arrangement of the welded cooling tubes, together with the additional stud shear connectors.

In the locations where internal or external forces are introduced into the liner, favorable conditions may be created by adapting the stud rigidity of the individual stud shear connectors to the prevailing need.

Friction is taken into consideration wherever it clearly exists. This is the case, for example, when the contact pressure is the result of internal pressure.

In the area of passages, which penetrate the cover of the pressure vessel in a conventional manner and permit the insertion and retraction of absorber rods, the thickness of the liner is determined advantageously so that it is secure against bulging without additional anchorings.

The steel tubes penetrating through the wall of the vessel and the liner of the passages may be inserted through the liner in the conventional manner. There are no convexities of the liner in this area which contribute to the economical manufacture of the liner.

The radii of the transition areas of the liner from its cylindrical part to the bottom and roof liner are preferably chosen so that the anchoring of the liner with stud shear connectors alone is possible. Here again, in cases where it clearly exists, friction is taken into account.

In the anchoring of loads, which as described above, is again effected by means of stud shear connectors only, it is appropriate to determine the length of the stud shear connectors as a function of the number of the reinforcing rods required for transmission of loads in the concrete. With greater stud lengths, for reasons of space, a larger number of reinforcing rods may be placed in the area of the introduction of loads.

As mentioned above in order to obtain a favorable introduction of forces at the locations of their introduction, stud shear connectors of varying rigidity are employed. The variation in stud rigidity may be obtained in different ways. Thus, in the particular area involved, stud connectors with different stud diameters or different stud lengths may be used. But varying stud rigidities may also be obtained by providing recesses filled with a soft material (in the area of the stud/liner joints), in a conventional manner. These cavities without concrete restrict the contact of the stud shear connector to a certain length.

Similar free spaces may be present further around the steel tubes of the passages in the area of their exit from the concrete of the vessel. They may be filled with a material of a lower elasticity. Their objective is to reduce the bending stress in the steel tubes.

According to a further development of the invention, the liner may consist of flat metal plates, i.e. lining is effected with flatplates even in the curving areas of the reinforced concrete pressure vessel. This has the advantage that it is not necessary to form round the plates. Furthermore, the distortion due to welding is less, so that the stiffening structure may be much less expensive. The transition locations of the liner from its cylindrical part to the roof and bottom liners again may consist of at least one flat plate.

By means of a special division of the plates of the cylindrical part of the liner, the transitions may have still another configuration. Thus, the individual plates of the cylindrical liner part may be joined with a seam at their centers in the vertical direction, and the plates are arranged so that their seaming edges are meeting a weld joint between two segments of the bottom and roof liner, while the welds of the individual plates impact the center of a segment. The horizontal edges of the individual plates are welded directly to the outer edges of the segments of the bottom and roof liners. The plate division proposed above eliminates cross welds.

BRIEF DESCRIPTION OF THE DRAWINGS

In the drawings, several embodiments of the liner are shown schematically. In the drawings.

DETAILED DESCRIPTION OF THE PREFERRED EMBODIMENT

Figure 1:
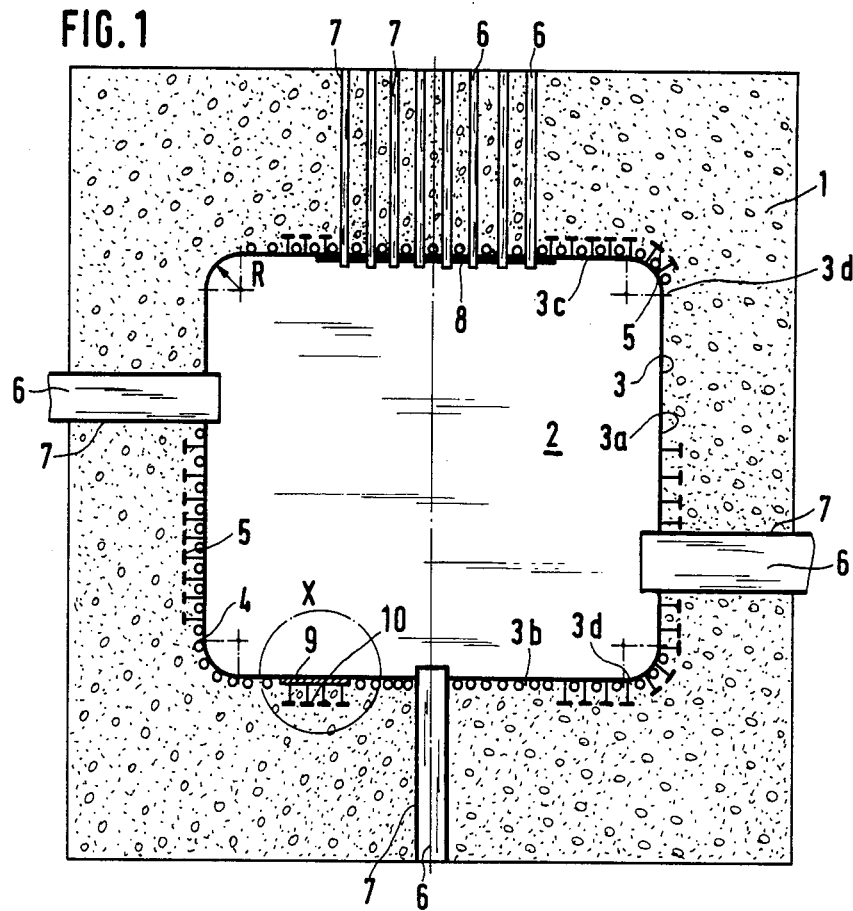
FIG. 1 shows in a longitudinal section a reinforced concrete pressure vessel for a nuclear reactor with a liner.

FIG. 1 shows a cylindrical reinforced concrete pressure vessel 1 containing a cavity 2 to receive a high temperature reactor. The cavity 2 is provided with a liner 3 made of steel plate with a thickness of 10-20 mm, preferably 12 mm. The liner 3 comprises a cylindrical part 3a, the flat bottom liner 3b and the roof liner 3c, and two toroidal transitions 3d. A plurality of tubes 4 (not all shown) is welded to the liner on the side of the concrete, constituting the liner cooling system. The tubes 4 simultaneously serve to anchor the liner 3 in the pressure vessel 1 and their arrangement is, therefore, such that the highest possible support effect is achieved.

To further anchor the liners 3, a plurality of stud shear connectors 5 is provided (not all are shown). These are welded to the liner 3 and set in the concrete of the wall of the vessel. The grid of the stud connectors is correlated with the spacing of the cooling tubes 4 and the reinforcing structure of the concrete. For reasons of antibulging security, the thickness of the liner is determined as a function of the grid. Further, stud connectors 5 are provided at the liner transition locations 3d. The radius R of stud connector 5 is chosen so that additional anchoring elements, such as claws or the like, may be eliminated.

The liner 3 and the wall of the vessel contain a plurality of passages 6, each of which is lined with a steel tube 7. The steel tubes 7 are inserted through the liner 3, i.e., there are no concavities on the liner in these areas. One of the passages 6 is shown enlarged in FIG. 2.

In the roof of the pressure vessel, a plurality of passages 6 is arranged for the insertion and retraction of absorber rods. In this area, the liner 3 has a thickening 8. The thickness is determined so that the security against bulging of the liner 3 is assured without additional anchoring elements. There are, therefore, no stud shear connectors in this area.

In the bottom liner 3b as an example of a load anchoring and introduction a detail "X" is shown in the drawing. This detail is explained in FIG. 6. It comprises an anchor plate 9 set into the bottom liner 3b, and a plurality of stud connectors 10.

Figure 2:
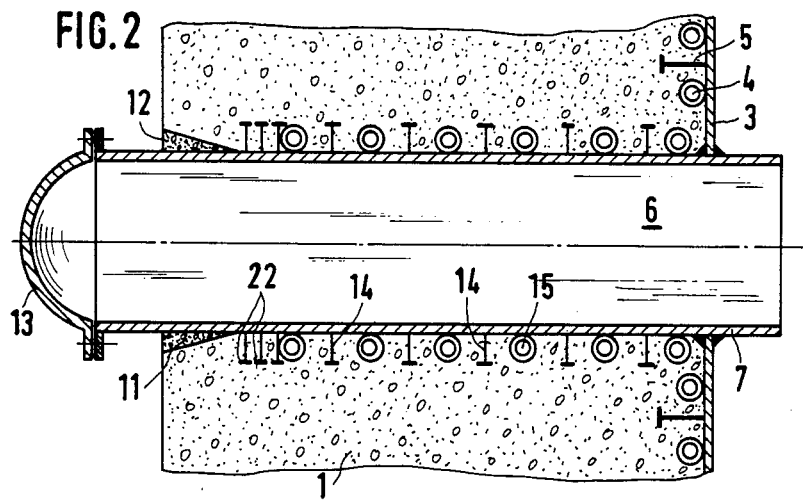
FIG. 2 illustrates an enlarged detail of FIG. 1 representing a passage through the wall, again in a longitudinal section.

As shown in FIG. 2, the steel tube 7 of the passage 6 represented therein protrudes both past the liner 3 and the wall of the vessel. The steel tube 7 is welded to the liner 3. In the area of its exit from the wall of the vessel an annular recess 11 is arranged around the steel tube 7, which is filled with a material 12 having an elasticity lower than steel. The bending stresses in the steel tube 7 are thereby reduced. Outside the reinforced concrete pressure vessel 1, the steel tube 7 is closed off with a cover 13. The anchoring of the steel tube 7 in the concrete of the wall of the vessel is effected merely by means of a plurality of stud connectors 14. Tubes 15, welded in the circumferential direction to the steel tube 7 and connected with the cooling system of the liner and additional stud connectors 22 secure the steel tube 7 against ejection.

Figure 3:
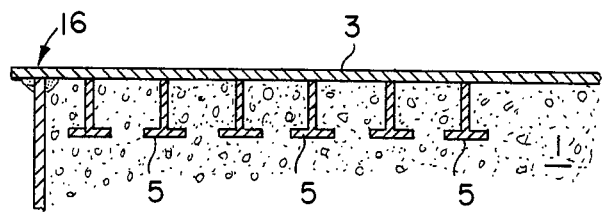
FIG. 3 shows a part of the liner with a force introduction location with favorable transfer conditions.
Figure 4:
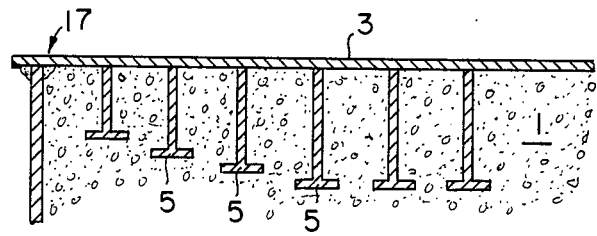
FIG. 4 demonstrates a further part of the liner with a different favorable force introduction arrangement.
Figure 5:
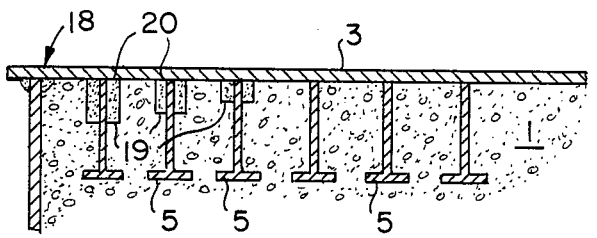
FIG. 5 shows a further alternative of a favorable force introduction arrangement.

FIGS. 3, 4 and 5 show three examples of a favorable mode of handling forces at the force introduction locations. They are based on the use of stud connectors 5 of different stud rigidities.

In the example shown in FIG. 3, the stud connectors 5 at the force introduction location 16 have different diameters. FIG. 4 shows that the stud connectors 5 in the area of the force introduction location 17 are of different lengths. In the force introduction location 18 shown in FIG. 5, the different rigidity of the stud connector 5 is attained by cavities 19 at the "foot" of the stud, around said connectors, wherein contact with the concrete of the pressure vessel is restricted. In the cavities 19, a soft material 20 is arranged, which may be wound around the stud 5. The cavities 19 may be staggered in their lengths as indicated in FIG. 5.

Figure 6:
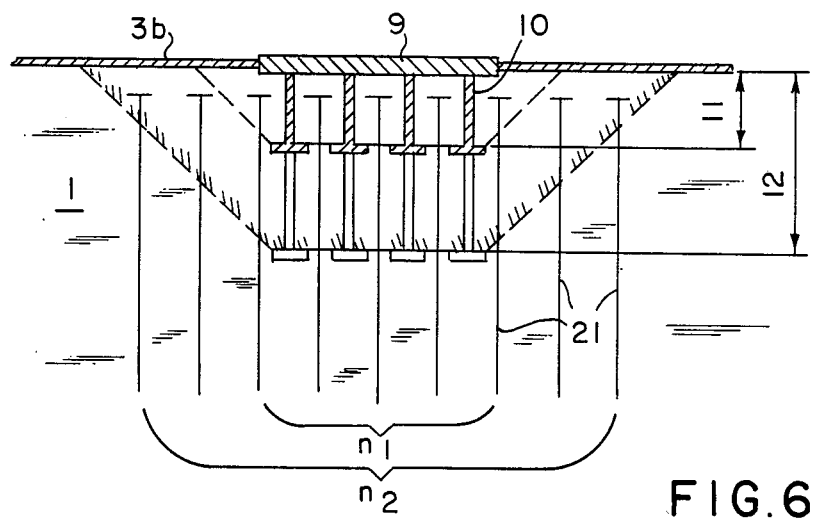
FIG. 6 illustrates a detail designated by "X" in FIG. 1 in an enlarged view.

In FIG. 6, an example for the introduction of a load and anchor plate 9 set into the bottom liner 3b, as shown. This plate is used to fasten a load. Here again, the liner and the anchor plate 9, respectively, are anchored merely by stud connectors 10 in the wall of the vessel. Further transmission in the concrete is effected by the reinforcing rods 21, set into the concrete between the stud connectors 10 and adjacently to them. The number of reinforcing rods 21 depends on the magnitude of the load to be introduced.

In order to have the necessary space for the reinforcing rods 21 available, the length of the stud connectors 10 is determined as a function of the number of reinforcing rods 21. As seen in FIG. 6, in the case of $n_1=5$ reinforcing rods, a length $l_1$ of the stud connectors is sufficient; for $n_2=9$ reinforcing rods, the stud connectors must have a length $l_2$.

Figure 7:
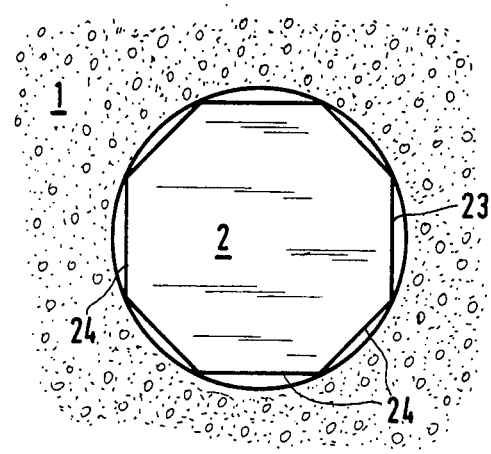
FIG. 7 shows a variant of the liner according to the invention in a top view.

In the variant shown in FIG. 7, the liner 23 according to the invention is composed not as heretofore of curved, but of flat plates 24 with the plates joined to each other by welding. It is, therefore, not necessary to preshape the plates and the distortion due to welding is less.

Figure 8:
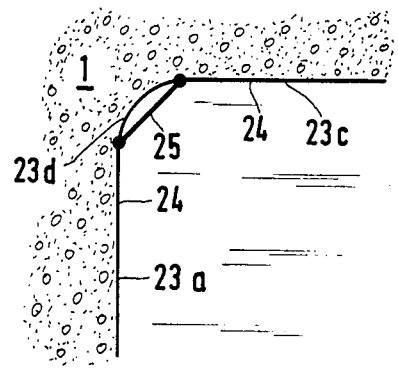
FIG. 8 shows a transition location of the liner of FIG. 7 in an enlarged view.

FIG. 8 shows the configuration of a transition 23d from the cylindrical part of the liner 23a to the roof liners 23c. The transition again comprises a flat plate 25 welded to the plates 24 of the liner parts 23a and 23c. In place of a plate 25, the transition may consist of several flat plates (not shown).

Figure 9:
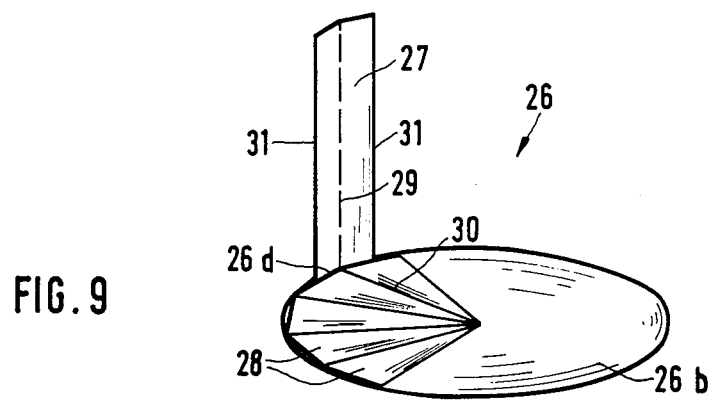
FIG. 9 illustrates a section of a second variant of the liner according to the invention in a perspective view.

FIG. 9 shows a further possible configuration of the transition of the bottom or roof liner to the cylindrical part of the liner 26. At this transition 26d, the bottom liner 26b which comprises segments 28 and the cylindrical liner part constructed of flat plates 27 are joined directly with each other by welding. In order to avoid cross welds, a special arrangement and configuration of the plates 27 is provided. The plates 27 thus have in their center a vertical seam. The edge 29 of the seam is meeting in each case one of the weld joints 30 between the segments 28 of the bottom liner 26b. The welds 31 of the plates 27 on the other hand contact always the center of one of the segments 28.

What is claimed is:

1. A metal liner having top, bottom and sides for lining the cylindrical cavity of a reinforced concrete pressure vessel for a nuclear reactor comprising:
    (a) a first plurality of stud shear connectors welded to the exterior side of said liner;
    (b) a plurality of cooling tubes welded to the exterior side of said liner;
    (c) a second plurality of stud shear connectors having a rigidity selected to withstand forces acting on an area of said liner greater than the forces acting on said liner in the area of said first plurality of stud shear connectors;
    (d) at least one steel tube penetrating said liner;
    (e) at least one area of said liner having a greater thickness than the remaining areas of said liner;
    (f) a plurality of passages through said liner in said area of greater thickness; and
    (g) a plurality of shear stud connectors and cooling tubes welded to the exterior of said at least one steel tube penetrating said liner.

2. The metal liner of claim 1, wherein:
    said first plurality of stud shear connectors and said plurality of cooling tubes area arranged in a grid according to the forces acting on said liner.

3. The metal liner of claim 1, further comprising a plurality of reinforcing rods adjacent said second plurality of stud shear connectors and cooperating with said second plurality of stud shear connectors to transmit said forces away from said liner.

4. The metal liner of claim 1, further comprising means for securing said liner against the forces of friction.

5. The metal liner of claim 1, wherein said area of said liner having a greater thickness is void of any of said first or second plurality of stud shear connectors.

6. The metal liner of claim 1, wherein said cooling tubes and said shear stud connectors alternate with one another on said exterior side of said liner.

7. The metal liner of claim 1, wherein said second plurality of shear stud connectors are located on said liner at an area of increased stress.

8. The metal liner of claim 1, wherein said at least one steel tube is welded to said liner in the area of passage through said liner.

9. The metal liner of claim 1, wherein said second plurality of stud shear connectors are of different length than said first stud shear connector.

10. The metal liner of claim 1, wherein said second plurality of stud shear connectors are of a different diameter than said first stud shear connector.

11. The metal liner of claim 1, wherein said second plurality of stud shear connectors have bases surrounded by cavities filled with soft material softer than concrete or steel.

12. The metal liner of claim 1, wherein said liner has cylindrical sides.

13. The metal liner of claim 1, wherein said liner comprises a plurality of flat plates forming side walls.

14. The metal liner of claim 13, wherein the individual plates of the cylindrical part of the liner are seamed in the vertical direction in their center and the seam edges are meeting a weld each between two segments of the bottom of the liner and the roof liner wherein, the welds of the individual plates impact the center of a segment and wherein the individual plates are jointed directly by welding with said segments.

* * * * *